J. L. CREVELING.
ELECTRIC REGULATION.
APPLICATION FILED SEPT. 16, 1910.
1,186,890.
Patented June 13, 1916.
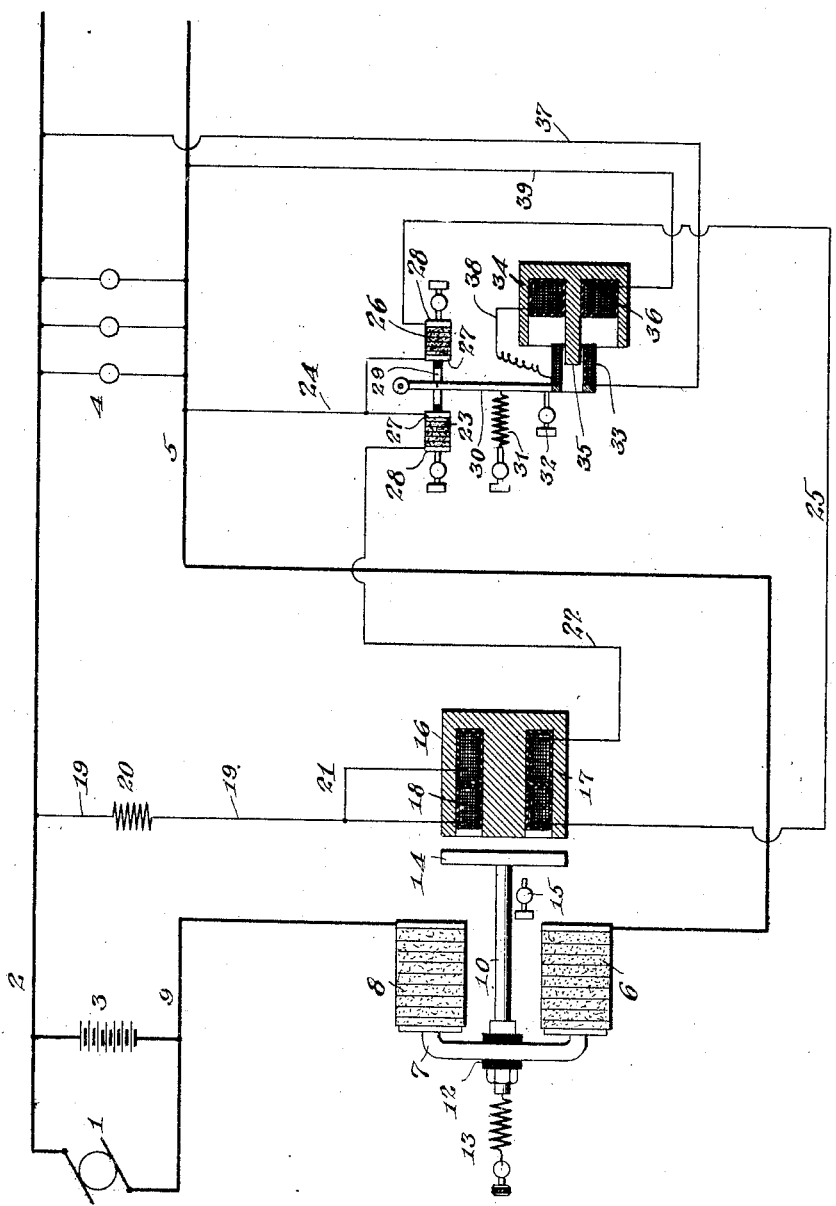
WITNESSES
INVENTOR

UNITED STATES PATENT OFFICE.

JOHN L. CREVELING, OF NEW YORK, N. Y., ASSIGNOR TO SAFETY CAR HEATING AND LIGHTING COMPANY, A CORPORATION OF NEW JERSEY.

ELECTRIC REGULATION.

1,186,890.  Specification of Letters Patent.  Patented June 13, 1916.

Application filed September 16, 1910. Serial No. 582,285.

*To all whom it may concern:*

Be it known that I, JOHN L. CREVELING, a resident of New York, in the county and State of New York, have invented certain new and useful Improvements in Electric Regulation, as set forth in the annexed specification and drawing forming a part thereof.

My invention pertains to that class of electric regulation wherein it is desired to automatically govern an electric circuit in a predetermined manner.

My invention has for its particular object to provide means whereby the current in a circuit or the voltage across a circuit may be automatically governed in response to changes in said circuit.

As my invention is particularly applicable to a system wherein it is desired to maintain a constant voltage upon a lamp or translation circuit throughout changes in voltage at the source from which said circuit is supplied, it will be described with reference to such a system.

The drawing is a diagrammatic representation of one system embodying my invention.

In the drawing 1 represents a dynamo or generator from the positive terminal of which the lead 2 is carried to one side of the storage battery 3 and lamps or translating devices 4. From the opposite side of the translating devices 4 the main 5 is carried to one end of the carbon pile 6, the other end of which is electrically connected as by the yoke 7 with one end of the carbon pile 8, the other end of which is connected as by lead 9 with the storage battery and negative pole of the generator 1. The conducting yoke 7 is adjustably connected with the rod 10 as by nuts 11 engaging insulating bushings 12.

13 is an adjustable spring normally tending to move the yoke in a left handed direction so as to reduce the pressure upon the carbon piles 6 and 8.

14 represents an armature preferably of circular form made of iron or other magnetic material and carried by the rod 10.

15 is an adjustable limiting screw for limiting the travel that can be caused by the spring 13.

16 is a magnet frame provided with windings 17 and 18. The winding 17 is connected with the lead 2 as by wire 19 and resistance 20 and wire 21. The opposite end of 17 is carried as by wire 22 to one side of the small carbon pile 23, the other side of which is connected as by wire 24 with the main 5. One end of the coil 18 is connected with the wire 19 while the other end of said coil is connected as by wire 25 with one end of the carbon pile 26, the opposite end of which is connected to the wire 24 leading to the main 5. The carbon piles 23 and 26 are held between conducting disks 27 and adjustable conducting members 28 as shown. The members 27 are carried by the member 29 pivotally mounted upon the lever 30 which is normally drawn in a left-handed direction as by spring 31. The limit of travel of the said lever under the influence of spring 31 is governed by the adjustable screw 32. The lever 30 is provided at its lower extremity with a spool or bobbin carrying the winding 33.

34 is a magnet frame provided with the extending core 35 passing into the central aperture of the bobbin 33 and provided with the winding 36. One end of the winding 33 is connected as by wire 37 with the lead 2. The other end of the said winding is connected as by wire 38 with one end of the winding 36, the opposite end of which is carried as by wire 39 to the main 5. The coils 33 and 36 are so wound that they set up magneto-motive forces causing the said coils to be attracted toward each other. The windings of coils 17 and 18 are such that the magneto-motive forces set up thereby oppose each other. It will be obvious that the current flowing through coils 17 and 18 will depend upon the resistance of the carbon piles 23 and 26 and that the resistance of these piles will depend upon the pressure applied thereupon and will, therefore, be altered upon movement of the lever 30.

The practical operation of my invention is substantially as follows:—If the generator be running and supplying current to the batteries 3 and translating devices, current will flow through lead 2 to the translating devices, thence to the main 5, thence to carbon pile 6, through yoke 7 and carbon pile 8 to the lead 9 and then back to the generator and it will be obvious that the voltage impressed upon the lamps or translating devices 4 will depend upon the resistance of the carbon piles 6 and 8 which will depend upon the pressure applied thereupon. The spring 13 tends to lessen this pressure and increase the resistance of the said piles, the limit of which may be determined as by adjustment of screw 15. Current will also flow from lead 2 through wire 19 and resistance 20 to wire 21, thence through coil 17, wire 22, carbon pile 23 and wire 24 to the main 5. This current will tend to attract the armature 14 against the action of spring 13 and compress the carbon piles 6 and 8 so as to lower the resistance thereof. The current flowing in the coil 17, and thus the pull upon the armature 14 caused thereby, will depend upon the resistance 23 and this may be adjusted under a given condition by adjusting the tension of spring 31, which spring tends to decrease the resistance 23 and increase the pull caused by the winding 17. Current will also flow through wire 37, winding 33, wire 38, winding 36 and wire 39 to the main 5 and thus tend to cause the lever 30 to be drawn toward the magnet 34—36 against the action of spring 31 in such manner as to reduce the resistance 26 which governs the current flowing in the coil 18 in shunt around and opposed to the coil 17. This will, of course, weaken the current flowing in magnet 17 by shunting a portion away from the same which portion traversing the winding 18 in a reverse direction will further weaken the effect of coil 17. This motion of the lever 30 will also increase the resistance 23 and in that manner further tend to decrease the current in the coil 17 and weaken the effect thereof. From this it will be obvious that very small movement given to the lever 30 will cause considerable variation in the pull caused by magnet 16—17—18 upon the armature 14 which tends to compress and govern the resistance of the carbon piles 6 and 8. I so adjust the spring 31 that when the normal voltage is reached upon the translation circuit a slight increase above this voltage will cause the lever to be drawn in a right-handed direction and thus decrease the pressure upon the carbon piles 6 and 8 as above set forth and raise the resistance thereof to cause a drop in the translation circuit voltage to compensate for said rise. Then any appreciable fall below this normal voltage will allow the spring 31 to swing the lever 30 in left-handed direction so as to increase the pull of magnets 16—17—18 and thus decrease the resistance in series with the translation circuit and compensate for said decrease in voltage in such manner as to hold the voltage substantially constant.

I do not wish in any way to limit myself to the exact details of construction shown in the accompanying drawing which is a mere diagrammatic representation of one form or system of electric regulation comprehending my invention, for it will be obvious that wide departure in the way of construction and detail of arrangement may be made without departing from the spirit and scope of my invention which is as set forth in the following claims:

1. Means for regulating an electric circuit comprehending a regulating element, electro-magnetic means for controlling the same comprehending a plurality of windings, a variable resistance in circuit with each of said windings for controlling the effect thereof, and electro-magnetic means for controlling said variable resistances.

2. Means for controlling an electric circuit comprehending a resistance varying element in said circuit, electro-magnetic means for controlling the resistance thereof comprehending a plurality of windings, a variable resistance in series with each of said windings and electro-magnetic means for increasing the resistance in series of one of said windings and decreasing the resistance simultaneously in another of said windings.

3. Means for regulating an electric circuit comprehending a resistance varying element in said circuit, electro-magnetic means for controlling the same comprehending a plurality of magnetically related windings, a plurality of current controlling means controlling the operating values of current in said windings and electro-magnetic means for governing said current controlling means.

4. Means for regulating an electric circuit comprehending a regulating element, electro-magnet means responsive to current fluctuations in said means for governing the same, means for controlling the effective strength of current in said electro-magnetic means comprehending a plurality of oppositely acting variable resistances, and electro-magnetic means for controlling the same.

5. Means for regulating an electric circuit comprehending circuit controlling means, electro-magnetic means controlling the same comprising a plurality of windings, variable resistances in series with each of said windings, means for controlling said variable resistances and electro-magnetic means for operating the controlling means.

6. Means for regulating an electric circuit comprehending a circuit controlling element, electro-magnetic means for governing the same, means for controlling the said electro-magnetic means comprehending a plurality of differentially acting variable resistances for varying the effective operating value of current therein and electro-magnetic means for governing said variable resistances.

7. Means for regulating an electric circuit comprehending a regulating element affected by variations in pressure thereupon, electromagnetic means tending to vary said pressure and means for controlling said electromagnetic means comprehending a plurality of variable resistances and electromagnetic means for simultaneously varying portions of said resistances in a positive and negative direction.

8. Means for regulating an electric circuit comprehending a regulating element, means for controlling the same comprehending a winding the magnetic strength of which determines the effect of said regulating element, a plurality of circuit controlling means oppositely affecting the effective strength of said magnet and electromagnetic means operating said circuit controlling means.

9. Means for controlling an electric circuit comprehending a regulating element, electromagnetic means for controlling the same comprehending a plurality of windings the relative magnetic strength of which affects said regulating element, circuit controlling means governing the magnetic strength of said windings and means for affecting said circuit controlling means simultaneously in opposite directions.

10. Means for controlling an electric circuit comprehending a regulating element, electromagnetic means for controlling the same comprehending a plurality of windings the relative magnetic strength of which affects said regulating element, circuit controlling means governing the magnetic strength of said windings, means for affecting said circuit controlling means simultaneously in opposite directions and automatic means for controlling the same.

11. Means for controlling an electric circuit comprehending a regulating element, electromagnetic means for controlling the same comprehending a plurality of windings the relative magnetic strength of which affects said regulating element, circuit controlling means governing the magnetic strength of said windings, means for affecting said circuit controlling means simultaneously in opposite directions and automatic means for controlling the same responsive to fluctuations in the circuit to be regulated.

12. The combination with a supply circuit and a work circuit fed thereby, of circuit regulating means interposed between said circuits, electromagnetic means for operating said regulating means responsive to variations in strength of current therethrough, a plurality of current controlling means affecting the current strength through said electromagnetic means and means for affecting said controlling means simultaneously in opposite senses.

13. The combination with a supply circuit and a work circuit fed thereby, of circuit regulating means interposed between said circuits, electromagnetic means for operating said regulating means responsive to variations in strength of current therethrough, a plurality of current controlling means affecting the current strength through said electromagnetic means, means for affecting said controlling means simultaneously in opposite senses and automatic means for operating said affecting means.

14. The combination with a supply circuit and a work circuit fed thereby, of circuit regulating means interposed between said circuits, electromagnetic means for operating said regulating means responsive to variations in strength of current therethrough, a plurality of current controlling means affecting the current strength through said electromagnetic means, means for affecting said controlling means simultaneously in opposite senses and automatic means for operating said affecting means responsive to fluctuations in the work circuit.

15. Means for controlling an electric circuit comprehending a resistance-varying element in said circuit, electro-magnetic means for controlling the resistance thereof comprehending a plurality of windings, a variable resistance in series with each of said windings, and means for operating said controlling means.

16. Means for regulating an electric circuit, comprehending circuit controlling means, electro-magnetic means controlling the same and comprising a plurality of windings, variable resistances in series with each of said windings, means for controlling said variable resistances, and electro-magnetic means for increasing the resistance in series with one of said windings, and decreasing the resistance simultaneously in series with another of said windings.

JOHN L. CREVELING.

Witnesses:
 CHAS. McC. CHAPMAN,
 M. HERSKOVITZ.